3,450,794
BUTADIENE-STYRENE-ACRYLONITRILE RESINS CONTAINING POLYPROPYLENE GLYCOL AS ANTISTATICIZER
Harold Ebneth and Heinrich Baer, Leverkusen, and Karl-Heinz Ott, Cologne-Stammheim, Germany, assignors to Farbenfabriken Bayer Aktiengesellschaft, Leverkusen, Germany, a Germany corporation
No Drawing. Filed July 1, 1964, Ser. No. 379,703
Claims priority, application Germany, July 11, 1963, F 40,209
Int. Cl. C08g 33/08; C09j 3/16
U.S. Cl. 260—876　　　　5 Claims

ABSTRACT OF THE DISCLOSURE

Synthetic thermoplastic copolymer mixtures of a butadiene elastomer and a thermoplastic styrene-acrylonitrile copolymer, plus about 1–10% by weight of a polypropylene glycol having a mean molecular weight of 2000–5000. The above mixture is found to be a good moulding composition which possesses and retains desirable antistatic properties.

---

The present invention relates to moulding compositions of elastic-thermoplastic copolymer mixtures having pronounced antistatic and good mechanical properties, and to a process for their preparation.

Known thermoplastic moulding composition of copolymer mixtures of butadiene-, styrene- and acrylonitrile-polymers have the particular advantage of combining a high impact strength with high hardness and tensile strength and a good workability. In many applications however, these known materials have the disadvantage of possessing a high electrical surface resistivity, which constitutes a substantial drawback with respect to the electrostatic behaviour of these products. As an example hereof, object prepared from such moulding compositions very rapidly collect dust, which is undesirable for many applications.

Various processes have been proposed for avoiding or reducing the electrostatic charging of thermoplastic moulding compositions, such as for example cellulose acetate and cellulose propionate. Thus, for example, shaped bodies produced from such materials are exposed to air saturated with water. By absorbing a certain amount of water vapour, the surface resistivity of such shaped structures will be so strongly reduced that they cease to collect dust. The essential drawback of this method that, on standing in dry air, the shaped structures lose their initially good antistatic properties very rapidly.

Another method of reducing the electrostatic charging of such shaped structures, for example in the case of polyolefines, comprises treating the surface of such shaped structures with various agents with a view of producing an electrically conductive film thereon which prevents the accumulation of electrostatic charges. This method has the drawback that such a film rubs off very rapidly during usage of the object and that the antistatic agent is often very hygroscopic, unfavourably affecting the surface of the object so treated or that the antistatic agent may not be physiologically harmless.

It has also been proposed to incorporate substances having an antistatic effect into the moulding compositions prior to processing, such as amines, amides, quaternary ammonium salts, sulphonic acids, aryl-alkylsulphonates, phosphoric acids, aryl-alkylphosphates, polyglycols and their derivatives, fatty acid esters of polyglycols, aryl- and alkyl-ethers of polyglycols as well as polyalcohols. However, to obtain a satisfactory antistatic effect, these substances would have to be incorporated into the thermoplastic moulding compositions in such amounts that the mechanical properties of the shaped structures prepared from such materials could not satisfy the requirements imposed on them, i.e., a substantial reduction of hardness, rigidity and of thermal stability could not be avoided.

With all these antistatic agents, the antistatic effect is achieved by the formation of an aqueous film on the surface of the shaped structures, which improves the surface conductivity.

French patent specification No. 1,250,926 describes the addition of polyalkylene glycols having a molecular weight of 200–1200 to act as an antistatic agent in shaped structures prepared from polyolefines. However, the polyalkylene glycols employed, added in amounts of 0.01 to 0.5% by weight are sufficiently effective only when their solubility in water, measured at a temperature of 25° C., is at least 0.5 g. per 100 g. of water. Moulding compositions, the electrostatic charging of which has been reduced by the addition of such water-soluble polyalkylene glycols, i.e., by formation of a water film on the surface lose their antistatic properties in all cases where the shaped structures prepared therefrom come into prolonged contact with water or water vapour which is frequently the case in practice.

It has now been found that synthetic thermoplastic materials based on copolymer mixtures of a butadiene elastomer and a thermoplastic styrene-acrylonitrile copolymer can be obtained which, in addition to the good mechanical properties characterising these products, also display a favourable electrostatic behaviour when such polymer mixtures contain small amounts of polypropylene glycols having a mean molecular weight of 2000 to 5000. These polypropylene glycols are insoluble in water.

This effect was surprising, since the antistatic effect due to the use of such polypropylene glycols is apparently not based on the formation of an aqueous film on the surface of the shaped structures as in the case of the previously known antistatic materials, but is substantially independent of the water content of the shaped structures and of the environment from a certain threshold value onwards. Owing to the complete insolubility in water of the polypropylene glycols employed, the antistatic agent will not be dissolved out from the shaped structures when they are stored in water.

It was found in particular that such thermoplastic compositions having antistatic properties and high strength, high impact and notched-impact strength and a very good thermal stability must be composed of A. 5–99 weight-percent, preferably 5–60 weight-percent of a graft copolymer, prepared by graft-copolymerisation of
　　(a) 10–95 weight-percent, preferably 10–80 weight-percent of a mixture consisting of (1) 50–90 weight-percent styrene and (2) 50–10 weight-percent acrylonitrile, wherein these two components may be wholly or partly replaced by their respective alkyl derivatives, on
　　(b) 90–5 weight-percent, preferably 90–20 weight-percent of a polymer of a conjugate diolefine with a portion of at least 80 weight-percent of intrapolymerised conjugate diolefine, and
B. 0–94 weight-percent, preferably 10 to 92 weight-percent of a thermoplastic copolymer prepared from
　　(a) 50–95 weight-percent styrene and
　　(b) 50–5 weight-percent of acrylonitrile, or from the alkyl derivatives of these two monomeric components, wherein the sum of acrylonitrile and styrene in the components A and B must not be less than 50 weight-percent, and C. 1–10 weight-percent of a polypropylene glycol having a mean molecular weight of between 2000 and 5000.

It can be gathered from the foregoing that the resin-forming monomers (i.e., styrene and acrylonitrile) are preferably extended in the form of a copolymer B with the graft-polymer component A (as the above given preference ranges indicate). However, it is also possible to graft these resin-forming monomers together on the graft base described under A from the outset, in which case the extending with a resin copolymer B can be dispensed with as is the condition whereby the sum of acrylonitrile and styrene in the components A and B together should not be less than 50 weight-percent.

According to a preferred embodiment of the present invention, the graft base of the above-mentioned graft copolymer component A, i.e., of the diolefine polymer containing a portion of at least 90% of conjugated diolefin, consists of a butadiene homopolymer.

According to a variant of the present invention, instead of using polybutadiene as graft base for the preparation of the graft-copolymer of component A, there may be employed copolymer of conjugate diolefines, such as copolymers of butadiene with isoprene and other 1,3-dienes as well as copolymers of conjugated diolefines with a portion of up to 10% of another copolymerisable monovinyl compound, such as styrene and/or acrylonitrile. It is further possible to replace the styrene and the acrylonitrile to be grafted (graft components) wholly or partly by their alkyl derivatives, especially α-methylstyrene or nucleally-alkylated styrenes or methacrylonitrile.

Especially suitable as graft base are polymers with a content of at least 90% of intrapolymerised butadiene, having a gel-content (i.e., a portion insoluble in toluene) or more than 80%.

According to another preferred embodiment, there is employed as copolymer component B a thermoplastic copolymer formed of styrene and acrylonitrile, which has a K value according to Fikentscher (Cellulosechemie 13, 58 (1932)) of at least 55, preferably at least 58–70. In particular, when observing the conditions of this preferred embodiment, there are obtained products which, in addition to good workability and good mechanical values, also have a high thermal stability. This appeared especially surprising, since according to experience to date it was to be expected that mixtures with resins having high K-values would have a bad workability and that the thermal stability would be strongly reduced by the addition of polypropylene glycol.

In the thermoplastic copolymer component B, styrene and acrylonitrile can be likewise replaced wholly or partly by their alkyl derivatives, especially α-methylstyrene and/or ring-substituted styrene or methacryonitrile. There come into consideration in this respect primarily thermoplastic copolymers formed of 45–65 weight-percent of styrene and 5–35 weight-percent of acrylonitrile wherein the styrene may be completely replaced by α-methylstyrene.

As component C according to the present invention there are employed polypropylene glycols having a molecular weight of at least 2000 to 5000 (tolerance ±100) and which are practically insoluble in water. According to a particular form of the present invention, as component C there is employed a purely linear polypropylene glycol with a molecular weight of 2000 and an OH-number of 56±1. The determination of the mean molecular weight was carried out with an ultracentrifuge.

The preparation of the graft copolymer component A can be effected in a manner known per se by polymerisation of the monomers to be grafted on (styrene and acrylonitrile) in the latex of the polydiolefine serving as graft base (e.g., polybutadiene). In principle, the same method will be employed as in the preparation of the resin component B.

As graft base for the preparation of A there is used a 1,3-diolefine, preferably a butadiene, homo- or copolymer latex with a portion of at least 90% of 1,3-diolefine in the polymer, prepared by emulsion polymerisation of the monomer in a manner known in principle. The emulsifiers, regulators, catalysts and electrolytes described in the preparation of B can be employed here in the limits indicated under B.

The preparation of the thermoplastic copolymer component from styrene and acrylonitrile is carried out preferably by polymerisation of the monomers in aqueous emulsion. The usual amounts of water, emulsifiers, regulators, polymerisation catalysts, pH-regulators and other additives can be employed. The concentration of the monomer or of the polymer may for example be of 20 to 50%, i.e., 400–100 parts by weight of water are employed for every 100 parts by weight of monomers.

Suitable emulsifiers may be sodium, potassium or ammonium salts of long-chain fatty acids with 10–20 carbon atoms, alkyl sulphates with 10–20 C-atoms, alkyl sulphonates with 10–20 C-atoms, alkyl-aryl sulphates with 10–20 C-atoms and resin acids (e.g. derivatives of abietic acid). Preferred emulsifiers are those which lose their emulsifying properties below pH 7 by formation of the free acids.

As regulators for controlling the molecular weight and thus the desired K-value there may be employed for example long-chain mercaptans such as duodecylmercaptan.

As polymerisation catalysts there may be employed inorganic or organic per-compounds or azo-compounds such as potassium- or ammonium persulphate, tert.-butylhydroperoxide, cumolhydroperoxide, or azodiisobutyric acid nitrile. It is also possible to employ redox systems formed from the aforementioned per-compounds and reducing agents, especially acids of low-valency sulphur such as formaldehyde-sulphoxylate, bases such as triethanolamine and the like.

As pH-regulators there may be added for example salts of orthophosphoric acid or of pyrophosphoric acid. The polymerisation can be carried out at pH-values of between 2 and 11; the preferred working pH is of 7 to 11.

The polymerisation temperature may be 20 to 120° C., preferably between 40 and 90° C.

The addition of the polypropylene glycols to the copolymer components to be employed according to the present process and to the elastomeric graft-copolymer components can be effected in various ways:

(1) It is possible to mix the polypropylene glycol into the coagulum of the latex mixture formed of the components A and B, the polyether being well absorbed even in the presence of water;

(2) The polypropylene glycols can be worked into the dry powder of the co-polymer mixture, advantageously with simultaneous addition of pigments, etc., with the aid of suitable mixing apparatus, for example single- or double-screw extruders or Banbury mixers;

(3) According to a preferred embodiment of the present invention, an emulsion of the polypropylene glycol (as explained hereinafter: is mixed with the latex mixture of the components A and B at room temperature and this mixture is subsequently coagulated in a known manner. It was found to be especially advantageous to use very finely divided polypropylene glycol emulsions.

The preparation of the polypropylene glycol emulsion can be carried out by stirring the polyether concerned into an aqueous emulsifier solution with the aid of a high-speed stirrer. The water is expediently employed in amounts of 0.5–2 parts of water for each part of polyether. The emulsifiers employed are the same as those considered in the preparation of the graft polymer and of the styrene-acrylonitrile copolymer (see above). The emulsifiers are employed in amounts of 0.5 to 5% calculated on the polypropylene glycol.

The coagulation of the mixtures according to the preferred embodiment [see (3)] can be carried out according to known methods, by mixing the latex-polyether mixture with electrolytes, especially with inorganic salts or acids, and heating the mixture to elevated temperatures if required. The nature of the coagulant to be employed depends on the emulsifier present in the mixture. In the presence of emulsifiers which are effective in both acid and alkaline media (alkyl sulphates and sulphonates), electrolytes such as sodium chloride, calcium chloride, magnesium sulphate or aluminium sulphate, are mainly employed. With emulsifiers which lose their effect in the acid range, the addition of acids, for example of hydrochloric acid or acetic acid suffices to effect coagulation.

It is also possible to bring about the coagulation by cooling the mixture to temperatures below 0° C. ("freezing out").

The processing of the coagulates is carried out in a manner analogous to the processing of the coagulates of elastic-thermoplastic copolymer-mixtures, i.e., by separating the coagulum, washing it free of electrolytes or until neutral and drying it at a temperature below 100° C., advantageously in vacuo. The dried material is then consolidated, homogenised and, if required granulated on suitable apparatus, for example roller mills, at temperatures between about 130 and 180° C. The compact and antistatic compositions so obtained can be subjected to the usual shaping processes on conventional machines such as injection-moulding units.

It is also possible to incorporate into the thermoplastic moulding compositions obtainable according to the present process the usual fillers, antiageing substances, pigments or releasing agents such as zinc stearate, calcium stearate or waxes.

The moulding compositions prepared according to the invention are distinguished having in addition to good mechanical data, i.e., high hardness, high notched impact strength (even at low temperatures) and good workability, a very good thermal stability and, simultaneously, a very good antistatic behaviour. The latter is all the more surprising, since it was hitherto generally assumed that the antistatic properties of a substance are linked directly with the formation of an aqueous film on the surface of a shaped structure. In addition, it was to be expected that owing to the addition of the polyether component the hardness and the thermal stability of such polymer compositons would be substantially reduced. Surprisingly, an effect of this kind is not manifested in the moulding compositions prepared according to the invention as demonstrated by the examples given hereinafter.

Unless otherwise indicated, the parts given in the following examples are parts by weight.

EXAMPLE 1

23,170 g. of a 30.2% latex of a graft polymer formed of 36 parts of styrene and 14 parts of acrylonitrile on 50 parts of polybutadiene (average particle size in latex: 0.4–0.6 micron) measured with the ultracentrifuge are mixed with 29,410 g. of a 44.2% latex of a copolymer formed of 72 parts styrene and 28 parts acrylonitrile with a K-value of 59.3 and an intrinsic viscosity of 0.80–0.71 and 3.353 g. of a 30% aqueous emulsion of a linear polypropylene glycol with a mean molecular weight of 2000±1000. The proportions of graft polymer:resin: polypropylene glycol are then 35:65:5. The polymer-polyether mixture thus obtained is coagulated with a 2% acetic acid solution, the coagulum is separated, washed neutral and dried in vacuo at 70–80° C.

The dried material is consolidated and homogenised in a roller mill heated to 165° C., then taken off in strips and comminuted on a hammer mill. Standard rods are formed from the granulate on an injection moulding machine, said rods having the mechanical data indicated in Table 1, section 1, and electrical data indicated in Table 2, section 1.

Comparative Example A

As in Example 1, 3720 g. of a 29.2% graft polymer latex formed of 36 parts of styrene and 14 parts of acrylonitrile on 50 parts of polybutadiene (with a mean particle diameter of 0.4 to 0.6 micron, measured on an ultracentrifuge), are mixed with 4580 g. of a 44% latex of a copolymer formed of 72 parts of styrene and 28 parts of acrylonitrile with a K-value of 59.3 and an intrinsic viscosity of 0.80–0.71. The ratio of graft polymer to resin is then of 35:65. The working-up and processing are carried out as in Example 1. The final product shows the mechanical values indicated in Table 1 under A and the electrical values indicated in Table 2, section A.

EXAMPLE 2

8680 g. of a 28.8% latex of a graft polymer formed of 36 parts of styrene and 14 parts of acrylonitrile on 50 parts of polybutadiene (average particle size in latex: 0.4–0.6 micron, measured with an ultracentrifuge) are mixed with 16,970 g. of a 44.2% latex of a copolymer formed of 72 parts styrene and 28 parts of acrylonitrile with a K-value of 59.3 and an intrinsic viscosity of 0.80–0.71 and 1676.5 g. of a 30% aqueous emulsion of a linear polypropylene glycol with a mean molecular weight of 2000 (±100).

The proportions of graft polymer:resin:polyether are as 25:75:5. The working-up, and the further processing of the polymer-polyether mixture is carried out in the same manner as in Example 1. The moulding composition obtained shows the mechanical and electrical data listed respectively in Table 1, section 2, and in Table 2 under section 2.

Comparative Example B

In analogy with Example 2, 2670 g. of a 29.0% latex of a graft polymer formed of 36 parts of styrene and 14 parts of acrylonitrile on 50 parts of polybutadiene (average particle size in the latex: 0.4–0.6 micron, measured with an ultracentrifuge) are mixed with 5340 g. of a 43.6% latex of a copolymer formed of 72 parts of styrene and 28 parts of acrylonitrile with a K-value of 59.3 and an intrinsic viscosity of 0.80–0.71. The graft polymer:resin ratio is then of 25:75. The working up and further processing are carried out as in Example 1. The polymer mixture shows the mechanical and electrical data listed respectively in Table 1, and in Table 2 under section B.

TABLE 1

[Comparison of the polymer-polypropylene glycol mixtures according to the invention with pure polymer mixtures]

|  | Experimental Examples— | | Comparative Examples— | |
| --- | --- | --- | --- | --- |
|  | 1 | 2 | A | B |
| Graft polymer portion | 35 | 25 | 35 | 25 |
| Copolymer portion Styrene:Acrylonitrile 72:28, K-value 59.3 | 65 | 75 | 65 | 75 |
| Polypropylene glycol, Mol. weight: 2,000 (±100) | 5 | 5 |  |  |
| Notched impact strength, kg.cm./cm.² according to DIN 53453 at— |  |  |  |  |
| 20° C | 15.0 | 12.5 | 13.4 | 4.4 |
| 20° C | 13.8 | 6.9 | 9.4 | 4.4 |
| −20° C | 8.8 | 5.0 | 5.6 | 4.4 |
| Indentation hardness, kg./cm.² according to DIN-proposal No. 53456 | 850 | 955 | 905 | 1,060 |
| Thermal resistance according to Martens, ° C | 70 | 73–76 | 70 | 72–74 |
| Thermal resistance according to Vicat, ° C | 113 | 120–121 | 113 | 120 |

On comparing the results of experimental Examples 1 and 2 with the results of the comparative Examples A and B, it is observed that the mechanical data of the products according to the invention correspond entirely to the mechanical data of the pure polymer mixtures, i.e., the hardness and the thermal resistance do not change.

TABLE 2
[Comparison of the polymer-polyether mixtures according to the invention with pure polymer mixtures—Electrical data]

| | Graft polymer portion | Copolymer portion (K-value:59) | Polyether portion, Mol. Wt. 2,000 | Surface (1) resistivity, R in Ohm | Polycaprolactam (2) Critical charge, v. cm.$^{-1}$ | Polycaprolactam (2) Half-life, sec. | Polyacrylonitrile (2) Critical charge, v. cm.$^{-1}$ | Polyacrylonitrile (2) Half-life, sec. |
|---|---|---|---|---|---|---|---|---|
| Experimental Example 1 | 35 | 65 | 5 | 4.10$^{13}$ | +1,400 | 550 | +1,600 | 730 |
| Comparative Example A | 35 | 65 | | >10$^{14}$ | −4,000 | >3,600 | +7,100 | >3,600 |
| Experimental Example 2 | 25 | 75 | 5 | 2.10$^{13}$ | +960 | 280 | +1,000 | 480 |
| Comparative Example B | 25 | 75 | | >10$^{14}$ | −2,300 | >3,600 | +4,500 | >3,600 |

When comparing the experimental Examples 1 and 2 according to the invention with the corresponding comparative Examples A or B, it is clearly seen that, not only the value of the surface resistivity but also the critical charge and the half-life period have been reduced.

Remarks to Table 2 and to all other tables containing electrical data:

(1) The surface resistivity is determined according to German standard tests identified as DIN 53482 or VDE 0303. Surface resistivity and charge are measured under identical atmospheric conditions. The values represent the resistance between two 10 cm. long electrodes, located at a distance of 1 cm. from each other.

(2) The plastics plate to be measured is fastened to a resilient retaining means with the aid of a ring. An arm lined with the friction partner rubs over the plate with a frequency of 1 Hz. The field strength between the sample plate charged by friction and the measuring head is measured and registered by means of the Schwenkhagen field strength measuring set. As friction partners there were employed fabrics which by their nature are close to the positive or negative end of the triboelectric series, such as polycaprolactam and polyacrylonitrile fabrics.

To avoid measuring errors due to wandering of material of the friction partner to the plastic sample, a fresh sample was used for each individual measurement.

There were measured:

A. The magnitude of the charge after a predetermined number of of rubbing movement (friction period 30 sec.).

B. The boundary value which the charge tends to on prolonged friction.

C. The time in which the charge after cessation of the friction reduces to one-half of its value (=half-life).

All measurement was carried out after sufficient conditioning in a conditioning cabinet. In each case, the data was compared to that of a sample with known behaviour.

EXAMPLES 3, 4 and 5

The graft polymer employed in Examples 3–5 also consisted of 36 parts of styrene and 14 parts of acrylonitrile, grafted on 50 parts of the aforementioned polybutadiene.

As resin component there was again employed a copolymer formed of 72 parts styrene and 28 parts acrylonitrile, with a K-value of 60 and an intrinsic viscosity of 0.93–0.87. As polypropylene glycol there was employed one having a mean molecular weight of 2000 (±100) and a OH-number of 56.

The preparation, working-up and subsequent processing of the polymer-polyether mixture were carried out in the manner described in Example 1. The proportions of graft polymer:styrene-acrylonitrile copolymer:polyether were varied in the following manner:

| Example | Graft polymer | Copolymer | Polyether, M.W. 2,000 |
|---|---|---|---|
| 3 | 35 | 65 | 2 |
| 4 | 35 | 65 | 4 |
| 5 | 45 | 65 | 6 |

The mechanical and electrical data of the moulding compositions thus obtained are listed in the Table 3 and Table 4, respectively, under sections 3, 4 and 5.

TABLE 3

| | Experimental Example— | | |
|---|---|---|---|
| | 3 | 4 | 5 |
| Graft polymer portion | 35 | 35 | 35 |
| Copolymer portion Styrene: Acrylonitrile 72:28, K-value 60; $\mu$=0.93–0.87 | 65 | 65 | 65 |
| (lypropylene glycol, Mol. wt. 2,000 ±100) | 2 | 4 | 6 |
| Notched impact strength, kg. cm./cm.$^2$ according to DIN 53453 at— | | | |
| 20° C | 14.4 | 14.4 | 15.5 |
| 0° C | 11.9 | 12.5 | 13.4 |
| −20° C | 8.1 | 10.0 | 10.0 |
| Indentation hardness, kg./cm.$^2$ according to DIN proposal 53456, 60 sec | 880 | 805 | 800 |
| Thermal resistance according to Martens, ° C | 72 | 72 | 72 |
| Thermal resistance according to Vicat, ° C | 112–114 | 114 | 113 |

TABLE 4
[Electrical data as a function of polyether-content of the polymer polyether mixture]

| Example | Graft polymer portion | Copolymer portion (K-value 60) | Polyether portion, M.W. 2,000 | Surface resistivity, R in Ohms | Polycaprolactam Critical charge, v. cm.$^{-1}$ | Polycaprolactam Half-life, secs. | Polyacrylonitrile Critical charge, v. cm.$^{-1}$ | Polyacrylonitrile Half-life secs. |
|---|---|---|---|---|---|---|---|---|
| 3 | 35 | 65 | 2 | 10$^{14}$ | +880 | 3,600 | +2,900 | 3,60 |
| 4 | 35 | 65 | 4 | 7.10$^{13}$ | +1,300 | 1,000 | +1,700 | 1,70 |
| 5 | 35 | 65 | 6 | 2.10$^{13}$ | +1,700 | 490 | +1,700 | 45 |

EXAMPLE 6

2000 g. of a homogeneous mixture of 35 parts of a graft polymer formed of 36 parts of styrene and 14 parts of acrylonitrile on 50 parts of polybutadiene and 65 parts of a copolymer formed of 72 parts of styrene and 28 parts of acrylonitrile with a K-value according to Fikentscher of 59.3 are intimately mixed with 40 g. of zinc stearate and 100 g. of a branched polypropylene glycol with a molecular weight of 4000 and an OH-number of 42 and then consolidated into a rolled sheet on a 2-roll mill within 10 minutes at 160° C. After cooling, the sheet was granulated in a cutter mill and from the granulate so prepared standard small rods and round discs were formed by injection moulding. The mechanical and electrical values measured on these test bodies are listed in Tables 5 and 6 under section 6.

EXAMPLES 7, 8 AND 9

If the polypropylene glycol employed in Example 6 is replaced by polypropylene glycols of the composition

| Example | Mol. weight | OH-number |
|---|---|---|
| 7 | 3,000 | 56 |
| 8 | 2,500 | 56 |
| 9 | 4,000 | 60 | and the polymer-polyether-releasing agent mixture is processed in the same manner as described in Example 6, then the values listed in Tables 5 and 6 under sections 7, 8 and 9 will be obtained.

Comparative Example C

If instead of the polypropylene glycol described in Example 6, having a molecular weight of 4000 and an OH-number of 42 there is employed a linear polypropylene glycol with a mol. weight of 2000 and an OH-number of 56, processing the resulting product and working it up in the same manner as in Example 6, then the mechanical and electrical data listed in Tables 5 and 6, section C, will be obtained.

TABLE 5

|  | Experimental Example— | | | | Comparative Example C |
|---|---|---|---|---|---|
|  | 6 | 7 | 8 | 9 |  |
| Graft polymer portion | 35 | 35 | 35 | 35 | 35 |
| Copolymer portion | 65 | 65 | 65 | 65 | 65 |
| Polypropylene glycol: |  |  |  |  |  |
| A. Mol. wt. 3,000 OH-number 56 |  | 5 |  |  |  |
| B. Mol. wt. 2,500 OH-number 56 |  |  | 5 |  |  |
| C. Mol. wt. 4,000 OH-number 60 |  |  |  | 5 |  |
| D. Mol. wt. 4,000 OH-number 42 | 5 |  |  |  |  |
| E. Mol. wt. 2,000 |  |  |  |  | 5 |
| Notched impact strength, kg. cm./cm.² DIN 53453 at: |  |  |  |  |  |
| 20° C | 16.6 | 11.9 | 13.1 | 10.6 | 15.0 |
| 0° C | 6.9 | 6.3 | 6.3 | 6.3 | 13.8 |
| −20° C | 5.0 | 5.0 | 5.0 | 4.4 | 8.3 |
| Indentation-hardness, kg./cm.², according to DIN-proposal 53456, 60 sec | 920 | 920 | 915 | 930 | 900 |
| Thermal resistance according to Martens, ° C | 77 | 76 | 77 | 76 | 70 |
| Thermal resistance according to Vicat, ° C | 114 | 112 | 113 | 114 | 114 |

TABLE 6

[Electrical data of various polymer-polyether-mixtures in function of the molecular weight of the polyether components]

|  |  |  |  |  |  | Friction partner | | | |
|---|---|---|---|---|---|---|---|---|---|
|  |  |  |  |  |  | Polycaprolactam | | Polyacrylonitrile | |
| Example | Graft polymer portion | Copolymer portion | Polyether, mol. wt. | Components, parts | Surface resistivity | Critical charge, v. cm.⁻¹ | Half-life, secs. | Critical charge, v. cm.⁻¹ | Half-secs. |
| 6 | 35 | 65 | 4,000 | 5 | 7.10¹³ | +1,700 | 630 | +3,100 | 920 |
| 7 | 35 | 65 | 3,000 | 5 | 4.10¹³ | +1,300 | 540 | +2,100 | 800 |
| 8 | 35 | 65 | 2,500 | 5 | 3.10¹³ | +2,300 | 570 | +3,600 | 690 |
| 9 | 35 | 65 | 4,000 | 5 | 3.10¹³ | +2,600 | 720 | +4,000 | 1,100 |
| C | 35 | 65 | 2,000 | 5 | 4.10¹³ | +1,400 | 550 | +1,600 | 730 |

TABLE 7

|  | Experimental Example 10 | Comparative Example D |
|---|---|---|
| Graft polymer portion | 27 | 27 |
| Copolymer portion α-methylstyrene-acrylonitrile, K-value 60 | 73 | 73 |
| Polypropylene glycol portion, Mol. wt. 2,000 | 5 |  |
| Notched impact strength, kg. cm./cm.² at: |  |  |
| 20° C | 11.9 | 11.9 |
| 0° C | 9.4 | 8.1 |
| −20° C | 5.6 | 6.3 |
| Indentation hardness, kg./cm.² after 60 secs | 920 | 1,040 |
| Dimensional stability in the heat according the Martens, ° C | 80 | 82 |
| Dimensional stability in the heat according to Vicat, ° C | 131 | 128 |

TABLE 8

[Electrical data of various polymer-polyether mixtures in comparison to pure polymer mixtures]

|  |  |  |  |  | Friction partner | | | |
|---|---|---|---|---|---|---|---|---|
|  |  | Copolymer portion, | |  | Polycaprolactam | | Polyacrylonitrile | |
| Example | Graft polymer portion | α-methylstyrene/acrylonitrile 70:30 | Polyether portion, M.W. 2,000 | Surface resistivity, R in Ohm | Critical charge, v. cm.⁻¹ | Half-life, secs. | Critical charge, v. cm.⁻¹⁰⁰ | Half-life, secs. |
| 10 | 27 | 73 | 5 | 2.10¹³ | −1,800 | 340 | +1,100 | 370 |
| Comparative Example D | 27 | 73 |  | >10¹⁴ | −3,600 | >3,600 | +5,100 | >3,600 |

EXAMPLE 10

8940 g. of a 30.2% latex of the graft polymer described repeatedly in the previous examples are mixed with 21500 g. of a 34% latex of a copolymer formed of 70 parts of α-methylstyrene and 30 parts of acrylonitrile (K-value 60; intrinsic viscosity 0.90–0.87) and 3353 g. of a 30% aqueous emulsion of a linear polypropylene glycol with a mean molecular weight of 2000 (±100) and then worked up as previously. The proportions of graft polymer, resin and polyether are then as 27:73:5. After rolling and granulation, the moulding compositions obtained display the mechanical and electrical data listed in Tables 7 and 8 under section 10.

Comparative Example D

If the polyether component of Example 10 is not added to the graft polymer, then after working-up and processing there is obtained a moulding composition which has the mechanical and electrical properties indicated in Tables 7 and 8, respectively, under section D.

EXAMPLE 11

2340 g. of a 29% latex of a graft polymer formed of 14 parts styrene and 6 parts of acrylonitrile on 80 parts of polybutadiene (prepared according to the process of German Auslegeschrift 1,241,107) by grafting on a polybutadiene latex with an average particle size of less than 0.1 micron as measured with an ultracentrifuge are mixed with 5590 g. of a 43.6% latex of a copolymer formed of 72 parts of styrene and 28 parts of acrylonitrile with a K-value of 60 and an intrinsic viscosity of 0.93–0.87 and 508.2 g. of a 30% aqueous emulsion of a liner polypropylene glycol with a molecular weight of 2000. The ratios of graft polymer to resin to polyether is then of 22:78:5. The working-up and the processing of the polymer-polyether mixture is carried out as described in the previous examples. The moulding compositions thus obtained yield the mechanical and electrical data listed in Tables 9 and 10, respectively, under section 11.

Comparative Example E

Instead of the polymer-polyether mixture described in Example 11, only a graft polymer-styrene-acrylonitrile copolymer mixture was used here, with the 72:28 ratio indicated in Example 11. After working-up the processing, the moulding composition showed the mechanical and electrical properties listed in Tables 9 and 10 respectively, under section E.

TABLE 9
[Comparison of the polymer-polypropylene glycol mixture according to the invention with pure polymer mixtures—mechanical data]

|  | Experimental Example 11 | Comparative Example E |
|---|---|---|
| Graft polymer portion | 22 | 22 |
| Copolymer portion Styrene-Acrylonitrile 72:28 | 78 | 78 |
| Polypropylene-glycol, Mol. wt. 2,000 | 5 | |
| Notched impact strength, kg. cm./cm.$^2$, DIN 53453 at— | | |
| 20° C | 24.5 | 21.2 |
| 0° C | 20.0 | 18.1 |
| −20° C | 17.5 | 16.3 |
| Indentation hardness according to DIN 53456 | 750 | 830 |
| Thermal dimensional stability according to Martens, ° C | 71 | 71 |

TABLE 11
[Comparison of the polymer-polyether mixtures according to the invention with polymer-polyether mixtures in which the copolymer component of comparative Example F has a K-value of 50.7]

|  | Experimental Example 12 | Comparative Example F |
|---|---|---|
| Graft polymer portion | 25 | 25 |
| Copolymer portion: | | |
| Styrene-acrylonitrile 72:28, K-value 59.3 | 75 | |
| Styrene-acrylonitrile 72:28, K-value 50.7 | | 75 |
| Polyether-component, Mol. wt. 2,000 | 5 | 5 |
| Notched impact strength, kg. cm./cm.$^2$, DIN 53453 at— | | |
| 20° C | 12.5 | 3.1 |
| 0° C | 6.9 | 3.1 |
| −20° C | 5.0 | 2.5 |
| Impact strength, kg. cm./cm.$^2$ | 82.5 | 37.2 |
| Indentation Hardness, kg./cm.$^2$ | 955 | 850 |

The above data clearly shows that the moulding compositions, the resin-component of which has a K-value of 50, are of low mechanical strength.

We claim:
1. A thermoplastic moulding composition consisting essentially of

TABLE 10
[Comparison of the polymer-polyether mixtures according to the invention with pure polymer mixtures—electrical data]

| | Graft polymer portion | Copolymer portion | Polyether, M.W. 2,000 | Surface-resistivity, R in Ohm | Friction-partner | | | |
|---|---|---|---|---|---|---|---|---|
| | | | | | Polycaprolactam | | Polyacrylonitrile | |
| | | | | | Critical charge, v. cm.$^{-1}$ | Half-life, secs. | Critical charge, v. cm.$^{-1}$ | Half-life, secs. |
| Experimental Example 11 | 22 | 78 | 5 | 3.10$^{13}$ | +1,100 | 430 | +1,000 | 600 |
| Comparative Example E | 22 | 78 | 0 | >10$^{14}$ | −3,500 | >3,600 | +3,100 | >3,600 |

EXAMPLE 12

8680 g. of a 28.8% latex of a graft polymer formed of 36 parts of styrene and 14 parts of acrylonitrile on 50 parts of polybutadiene (mean particle size in the latex: 0.4 to 0.6 micron, measured with the ultracentrifuge) are mixed with 16,970 g. of a 44.2% latex of a copolymer formed of 72 parts styrene and 28 parts acrylonitrile with a K-value of 59.3 and an intrinsic viscosity of 0.81–0.83 and 1676.5 g. of a 30% aqueous emulsion of a linear polypropylene glycol with a molecular weight of 2000. The proportions of grafto polymer, resin and polyether are then as 25:75:5. The working-up and the further processing of the polymer-polyether mixture are carried out as described in the previous examples. The moulding compositions thus obtained show the mechanical values listed in Table 11.

Comparative Example F

Instead of the styrene-acrylonitrile copolymer formed of 72 parts of styrene and 28 parts of acrylonitrile with a K-value of 59.3 and an intrinsic viscosity of 0.83–0.81, described in Example 11, a styrene-acrylonitrile copolymer with a K-value of 50.7 and an intrinsic viscosity of 0.67–0.62 was used. The proportions of graft-polymer, resin and polyether were again 25:75:5. The moulding composition obtained after working-up and processing yielded the mechanical data listed in Table 11.

(A) 5–99 weight-percent of a graft-polymer comprising the polymerization product of
  (a) 10–95% weight-percent of a mixture consisting of 50–90 weight-percent styrene or corresponding alkyl-substituted derivative, and 50–10 weight-percent acrylonitrile or corresponding alkyl-substituted derivative on
  (b) 90–5 weight-percent of a polymer of a conjugate diolefin with at least 80 weight-percent intrapolymerized conjugate diolefines graft base; and
(B) 0–94 weight-percent of a thermoplastic copolymer of
  (a) 50–95 weight-percent styrene or corresponding alkyl derivative and
  (b) 50–5 weight-percent of acrylonitrile or corresponding alkyl-substituted derivative;
the sum of the acrylonitrile and styrene components in (A) and (B) together being not less than 50 weight-percent; and
(C) 1–10 weight-percent of a polypropylene glycol having a mean molecular weight of 2000–5000.

2. Elastic, thermoplastic moulding compositions of claim 1 consisting essentially of
  (A) 5–60 weight-percent of a graft polymer of
    (a) 10–80 weight-percent of a mixture of 50–90 weight-percent styrene or corresponding alkyl substituted derivative, and 50–10 weight-percent acrylonitrile or corresponding alkyl-substituted derivative on (b) 20–90 weight-percent of a polymer of a conjugate diolefin having at least 90 weight-percent of intrapolymerized diolefin; and (B) 10–92 weight-percent of a thermoplastic copolymer of
  (a) 50–95 weight-percent of styrene or corresponding alkyl derivative, and
  (b) 50–5 weight-percent of acrylonitrile or corresponding alkyl-substituted derivative; and (C) 1–10 weight-percent of a polypropylene glycol with a mean molecular weight of between 2000 and 5000.

3. Moulding composition of claim 2 wherein the graft base of the graft polymer consists of 20–80 weight-percent of a polymer containing at least 90 weight-percent of butadiene and 0–10 weight-percent of a copolymerisable monovinyl compound.

4. Moulding composition of claim 2 wherein the thermoplastic copolymer is a copolymer with a Fikentscher K-value of above 58.

5. Moulding composition of claim 2 wherein the polypropylene glycol component is a completely linear polypropylene glycol having a molecular weight of about 2000.

References Cited
UNITED STATES PATENTS

| | | |
|---|---|---|
| 2,353,228 | 7/1944 | Ducca. |
| 2,393,863 | 1/1946 | Myers. |
| 2,525,691 | 10/1950 | Lee et al. |
| 3,073,798 | 1/1963 | Baer _____ 260—876 |

GEORGE F. LESMES, *Primary Examiner.*

U.S. Cl. X.R.

260—29.7, 33.2, 880